US010190463B2

(12) United States Patent
Kurpejovic et al.

(10) Patent No.: US 10,190,463 B2
(45) Date of Patent: Jan. 29, 2019

(54) EXHAUST SYSTEM, ESPECIALLY FOR AN INTERNAL COMBUSTION ENGINE OF A VEHICLE

(71) Applicant: Eberspächer Exhaust Technology GmbH & Co. KG, Neunkirchen (DE)

(72) Inventors: Enver Kurpejovic, Kirchheim/Teck (DE); Bernd Westerhoff, Winterbach (DE); David Binder, Esslingen (DE); Anika Bürkle, Remseck (DE); Gita Feyl-Narrain, Esslingen (DE); Steffen Glaser, Stuttgart (DE); Ruben Hass, Stuttgart (DE); Oleksandr Semenov, Plochingen (DE); Krishna Kumar Vempati, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/447,813

(22) Filed: Mar. 2, 2017

(65) Prior Publication Data
US 2017/0254244 A1 Sep. 7, 2017

(30) Foreign Application Priority Data

Mar. 3, 2016 (DE) .................. 10 2016 103 798
Apr. 19, 2016 (DE) .................. 10 2016 107 213

(51) Int. Cl.
*F01N 3/28* (2006.01)
*B01D 46/00* (2006.01)
(Continued)

(52) U.S. Cl.
CPC ........... *F01N 3/28* (2013.01); *B01D 46/0027* (2013.01); *B01D 53/9418* (2013.01);
(Continued)

(58) Field of Classification Search
CPC ........ F01N 3/28; F01N 3/2066; F01N 3/2892; F01N 13/16; B01D 53/9431; B01D 46/0027
(Continued)

(56) References Cited

U.S. PATENT DOCUMENTS

| 4,671,058 A | 6/1987 | Yoshida et al. |
| 2003/0079467 A1 | 5/2003 | Liu et al. |

(Continued)

FOREIGN PATENT DOCUMENTS

| DE | 102 23 148 A1 | 11/2003 |
| DE | 20 2012 011764 U1 | 1/2013 |

(Continued)

*Primary Examiner* — Tom P Duong
(74) *Attorney, Agent, or Firm* — McGlew and Tuttle, P.C.

(57) ABSTRACT

An exhaust system, especially for an internal combustion engine of a vehicle, includes an exhaust gas-carrying duct (14) and a reactant injection device (20) for injecting reactant (R) into exhaust gas (A) flowing in the exhaust gas-carrying duct (14). Downstream of the reactant injection device (20), a mixer device (22) supports the mixing of reactant (R) injected by the reactant injection device (20) with exhaust gas (A) flowing in the exhaust gas-carrying duct (14). Downstream of the reactant injection device (20) and upstream of the mixer device (22), a reactant heating device (24) extends in the exhaust gas-carrying duct (14). The exhaust gas (A) flows in and reactant (R) injected through the reactant injection device (20) flow around the heating device (24).

21 Claims, 8 Drawing Sheets

(51) Int. Cl.

| | |
|---|---|
| *B01D 53/94* | (2006.01) |
| *F01N 3/02* | (2006.01) |
| *F01N 3/035* | (2006.01) |
| *F01N 3/20* | (2006.01) |
| *F01N 13/16* | (2010.01) |
| *H05B 3/14* | (2006.01) |
| *H05B 3/40* | (2006.01) |
| *H05B 3/44* | (2006.01) |
| *B01D 53/90* | (2006.01) |

(52) U.S. Cl.
CPC ....... *B01D 53/9431* (2013.01); *F01N 3/0205* (2013.01); *F01N 3/035* (2013.01); *F01N 3/208* (2013.01); *F01N 3/2066* (2013.01); *F01N 3/2892* (2013.01); *F01N 13/16* (2013.01); *H05B 3/141* (2013.01); *H05B 3/40* (2013.01); *H05B 3/44* (2013.01); *B01D 53/90* (2013.01); *B01D 2251/2067* (2013.01); *B01D 2279/30* (2013.01); *F01N 2240/16* (2013.01); *F01N 2260/00* (2013.01); *F01N 2530/00* (2013.01); *F01N 2610/02* (2013.01); *F01N 2610/10* (2013.01); *F01N 2610/102* (2013.01); *F01N 2610/1453* (2013.01); *H05B 2203/027* (2013.01); *H05B 2214/03* (2013.01); *Y02A 50/2322* (2018.01); *Y02T 10/24* (2013.01)

(58) Field of Classification Search
USPC .................................................. 422/169, 174
See application file for complete search history.

(56) References Cited

U.S. PATENT DOCUMENTS

| | | | |
|---|---|---|---|
| 2011/0023461 A1* | 2/2011 | Strots | F01N 3/2066 60/286 |
| 2011/0258983 A1 | 10/2011 | Vosz | |
| 2012/0324981 A1* | 12/2012 | Hedayat | G01N 15/0656 73/23.33 |
| 2014/0050628 A1 | 2/2014 | Nakano et al. | |
| 2015/0152766 A1 | 6/2015 | Brunel | |
| 2015/0315943 A1 | 11/2015 | Gschwind | |

FOREIGN PATENT DOCUMENTS

| | | |
|---|---|---|
| DE | 10 2013 222 490 A1 | 5/2014 |
| DE | 10 2014 117048 A1 | 6/2015 |
| DE | 10 2014 111310 A1 | 2/2016 |
| EP | 0 190 557 A1 | 8/1986 |
| EP | 2 386 738 A1 | 11/2011 |
| EP | 2 826 973 A1 | 1/2015 |
| FR | 3 014 136 A1 | 6/2015 |
| JP | H05 296032 A | 11/1993 |
| RU | 2 525 172 C2 | 8/2014 |
| WO | 2004/112433 A1 | 12/2004 |
| WO | 2010/089375 A1 | 8/2010 |
| WO | 2013/087566 A1 | 6/2013 |
| WO | WO-2013087566 A1 * | 6/2013 ........... F01N 3/2066 |

* cited by examiner

EXHAUST SYSTEM, ESPECIALLY FOR AN INTERNAL COMBUSTION ENGINE OF A VEHICLE

CROSS REFERENCE TO RELATED APPLICATIONS

This application claims the benefit of priority under 35 U.S.C. § 119 of German Applications DE 10 2016 103 798.2 filed Mar. 3, 2016 and DE 10 2016 107 213.3 filed Apr. 19, 2016, the entire contents of which are incorporated herein by reference.

FIELD OF THE INVENTION

The present invention pertains to an exhaust system, by which, for example, the exhaust gases generated in an internal combustion engine of a vehicle can be released into the environment.

BACKGROUND OF THE INVENTION

DE 10 2014 117 048 A1 discloses an exhaust system, in which a reactant, for example, a urea/water solution, is injected to reduce the percentage of nitrogen oxides in the exhaust gas. To achieve better mixing of the reactant with the exhaust gas, the reactant injected in the form of a spray is injected towards an electrically energizable heating element. The electrically energizable heating element supports the evaporation of the reactant.

SUMMARY OF THE INVENTION

The object of the present invention is to provide an exhaust system, especially for an internal combustion engine of a vehicle, which provides for improved mixing of the reactant injected into an exhaust gas-carrying duct with exhaust gas flowing in the exhaust gas-carrying duct.

This object is accomplished according to the present invention by an exhaust system, especially for an internal combustion engine of a vehicle, comprising an exhaust gas-carrying duct, a reactant injection device for injecting reactant into exhaust gas flowing in the exhaust gas-carrying duct, downstream of the reactant injection device, a mixer device for supporting the mixing of reactant injected through the reactant injection exhaust gas flowing in the exhaust gas-carrying duct, and downstream of the reactant injection device and upstream of the mixer device, a reactant heating device, which extends in the exhaust gas-carrying duct and around which exhaust gas and reactant injected through the reactant injection device can flow.

The present invention combines the aspect of supporting the reactant evaporation by a reactant heating device arranged upstream in the exhaust gas-carrying duct with the intensified swirling generated by a mixer device.

To make it possible to use the reactant heating device provided according to the present invention upstream of the mixer device efficiently, the reactant heating device may extend in the volume area covered by a reactant spray cone formed during the reactant injection. It shall be stressed here that it can be assumed, in principle, that the reactant released from the reactant injection device based on exhaust gas flowing in the exhaust gas-carrying duct will not expand in the form of an exact geometric cone. The volume area into which the reactant released from the reactant injection device is released at least predominantly is considered in the sense of the present invention as a reactant spray cone or the volume area covered by this.

The reactant heating device may comprise at least one heating element, which can be electrically energized and around which exhaust gas and reactant can flow. Such a heat conductor element is heated, in general, based on its ohmic resistance. Such a heat conductor element may, of course, also be surrounded by an electrically insulating material in order to avoid an electric short-circuit.

Such a heat conductor element may preferably form a closed heat conductor loop, so that a comparatively great thermal interaction length can be provided.

Provisions may be made in an alternative design embodiment for at least one heat conductor element to have a band-like (band, band-shape) configuration and a band surface that is essentially parallel to the exhaust gas flow direction. It should be noted that band-like (band, band-shape) means in the sense of the present invention that the heat conductor element thus formed is essentially flat and broadly extended at right angles to its longitudinal extension, so that an essential portion of the surface of a heat conductor element thus configured is provided by the two broad sides of said heat conductor element.

To make it possible to increase the efficiency of the reactant heating device, a plurality of heat conductor elements having a band-like configuration may be arranged one after another in the exhaust gas flow direction.

Further, an enlargement of the surface for the thermal interaction may be achieved by at least one heat conductor element being wound in a meandering manner in at least some areas.

In an alternative type of embodiment, the reactant heating device may comprise at least one heating element that can be heated by electric energization and at least one essentially plate-shaped heat transfer element that is in heat transmission connection with the heating element. A direct contact between the reactant and the heating element itself is not necessarily provided or necessary in this embodiment. The at least one plate-shaped heat transmission element rather provides the surface that comes into contact with the reactant by wetting and contributes to the evaporation thereof.

To compromise the exhaust gas flow in the exhaust gas-carrying duct as little as possible, at least one plate-shaped heat transmission element may have a heat transmission element surface that is essentially parallel to an exhaust gas flow direction.

To establish a stable connection of a heating element to this associated heat transmission element, at least one heating element may be held between two plate-shaped heat transmission elements, which are connected to one another and are preferably in contact with one another in at least some areas.

Provisions may be made for an improved heat transfer for metal powder or/and graphite material being preferably arranged between at least one plate-shaped heat transmission element and a heating element.

Provisions may further be made for an improved exhaust gas flow characteristic for at least one plate-shaped heat transmission element to have a plurality of exhaust gas passage openings or/and exhaust gas guide elements.

Provisions may be made in an embodiment that is especially advantageous for use in the corrosive environment provided by the exhaust gases and the reactant for the reactant heating device to comprise at least one ceramic heating element that can be heated by electric energization.

To make it possible to provide an efficient thermal interaction here, it is proposed that at least one ceramic heating element comprise a plurality of rod-shaped heating sections.

In another advantageous embodiment the reactant heating device may comprise at least one heating element that can be heated by electric energization and a porous reactant receiving body surrounding the heating element in at least some areas, preferably a receiving body consisting of metal foam material or wire mesh. The porous reactant receiving body can at first receive the reactant falling on the porous reactant receiving body in the form of droplets by capillary action and then continuously release same based on its elevated temperature, so that a uniform reactant release is guaranteed.

A reactant treatment device, e.g., a catalytic converter device for selective catalytic reduction or/and a particle filter, may be arranged upstream of the mixer device.

The present invention further pertains to a heating element for a reactant heating device of an exhaust system, preferably of an exhaust system having the above-described configuration. The heating element comprises at least two heat conductor sections, which are wound in a meandering manner, adjoin each other in a connection area and extend essentially next to one another.

A great interaction length or interaction surface is provided in such an embodiment of a heating element for heating a reactant injected into the exhaust gas flow in an exhaust system.

Provisions may preferably be made for each heat conductor section to have, following one another in a longitudinal direction of the heat conductor section, a plurality of bulges oriented alternatingly opposite each other essentially at right angles to the longitudinal direction of the heat conductor section, wherein bulges oriented in the same direction at right angles to the longitudinal direction of the heat conductor in at least two heat conductor sections are offset in relation to one another in the longitudinal direction of the heat conductor section. It can be guaranteed in case of such an embodiment that by avoiding a congruent positioning of the heat conductor sections, there is an efficient flow around all surface areas of said sections and all surface areas can thus be utilized to heat the reactant.

A large surface available for the heating can be provided in a preferred embodiment by the heat conductor sections with the connection area connecting these sections having a band-like configuration.

To generate the lowest possible flow resistance for the exhaust gas flowing in an exhaust system, it is proposed that band surfaces of the heat conductor sections, which band surfaces are provided on broad sides of the heat conductor sections, be oriented essentially parallel to one another.

Two heat conductor sections may have a connection area in the heat conductor element in a respective first end area for electrical contacting and adjoin another heat conductor section via a connection area in a respective second end area.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
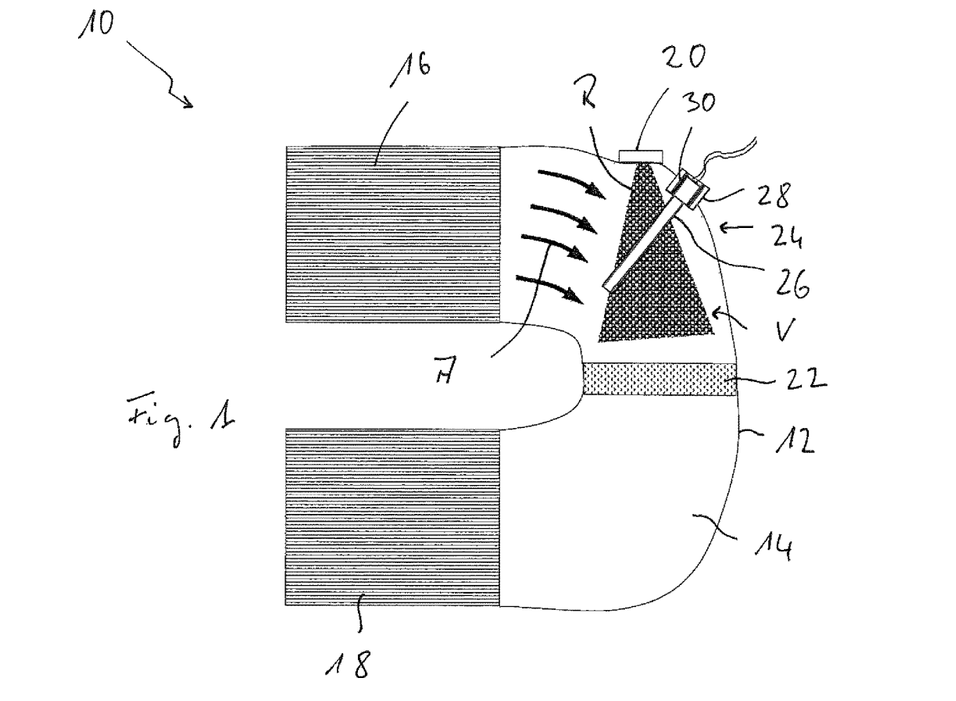
FIG. 1 is a sectional view of an exhaust system with a reactant injection device, with a mixer device downstream of the reactant injection device and with a reactant heating device between them.

Referring to the drawings, FIG. 1 shows a schematic view of a section of an exhaust system 10, for example, for an internal combustion engine of a vehicle. The exhaust system 10 comprises in an exhaust pipe 12 an exhaust gas-carrying duct generally designated by 14. A first exhaust gas treatment device 16, which may be configured, for example, as a diesel oxidation catalytic converter or as a lean NOx trap, may be provided in an upstream area of the section shown in FIG. 1. A second exhaust gas treatment device 18 may be provided in a downstream area of the shown section of the exhaust system 10. This treatment device may comprise, for example, a catalytic converter device for selective catalytic reduction or a particle filter.

A reactant injection device 20 generally also called injector, is provided in the section of the exhaust gas-carrying duct 14 located between the two exhaust gas treatment devices 16, 18. This device injects a reactant, for example, a urea/water mixture, into the exhaust gas-carrying duct 14 in order to achieve mixing of the reactant R thus injected with the exhaust gas A flowing in the exhaust gas-carrying duct.

A mixer device 22 is provided in the exhaust gas-carrying duct 14 downstream of the reactant injection device 20. This is used to achieve improved mixing of the reactant R with the exhaust gas A and may comprise a plurality of deflecting surfaces, which are positioned obliquely in relation to the exhaust gas flow direction and thus ensure swirling of the flow. Since the comparatively hot exhaust gas A flows around the mixer device 22, the mixer device is also heated by this exhaust gas, so that the reactant R, which initially still reaches the deflecting surfaces of the mixer device 22 in the form of droplets, is heated by the mixer device 22 itself and thus its evaporation is intensified.

A reactant heating device 24 is provided downstream of the reactant injection device 20 and upstream of the mixer device 22 in the exhaust gas flow direction. This reactant heating device comprises a heating element 26, which can be heated by electrical energization and is carried on the exhaust pipe 12 via a carrier 28 and an insulation device 30, for example, mica or the like. The heating element 26 extends into the volume area V occupied by the spray cone of the reactant R, which spray cone is formed by means of the reactant injection device 20 and is thus available for the thermal interaction with the exhaust gas A flowing in the exhaust gas-carrying duct with nearly its entire length of extension.

Figure 2:
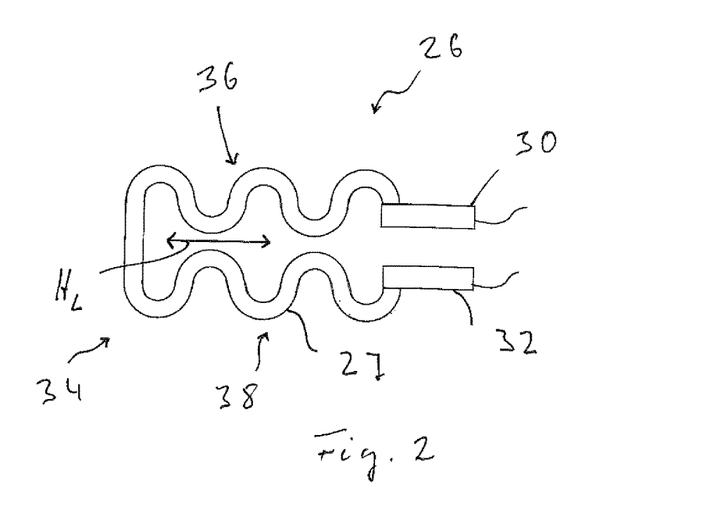
FIG. 2 is an end view of the electrically energizable heat conductor element of the reactant heating device according to FIG. 1.

An example of such a heating element 26 that can be heated by electrical energization is shown in FIG. 2. The heating element 26 is configured as a heat conductor element 27 and forms between two connection areas 30, 32, which may be carried via the carrier 28 shown in FIG. 1 on the exhaust pipe 12, a closed loop 34 with two loop sections or heat conductor sections 36, 38, which are located next to one another and are wound in a meandering pattern, i.e., essentially have an undulated or wave-like structure. The heat conductor element 27 may comprise a core area, which can be heated in case of electrical energization based on its ohmic resistance and which is surrounded by an electrically insulating jacket. The heat conductor element 27 may, of course, also have other profiling, as is shown in FIG. 2. It is configured essentially with a V section or U section, and the configuration shown in FIG. 2 as a closed loop with meandering loop sections is especially advantageous because of the comparatively great interaction length with the reactant R released by the reactant injection device.

The embodiment of a heat conductor element 27 shown in FIG. 2 shows that due to its meandering structure, each of the two heat conductor sections 36, 38 has a plurality of bulges oriented at right angles to the longitudinal direction HL of the heat conductor following one another and alternatingly at right angles to the longitudinal direction HL of the heat conductor. The bulges of the two heat conductor sections 36, 38 oriented in the same manner at right angles to the longitudinal direction HL of the heat conductor are offset in relation to one another in the longitudinal direction HL of the heat conductor.

The reactant R flowing around the heating element 26 or heat conductor element 27 is heated and at least partially evaporated by the heating element 26 or heat conductor element 27. The reactant R, which reaches the mixer device 22 in this already evaporated or heated state, can be further heated and thus completely evaporated in the mixer device 22 based on the effect already described above and mixed completely and uniformly with the exhaust gas A flowing in the exhaust gas-carrying duct 14.

Figure 3:
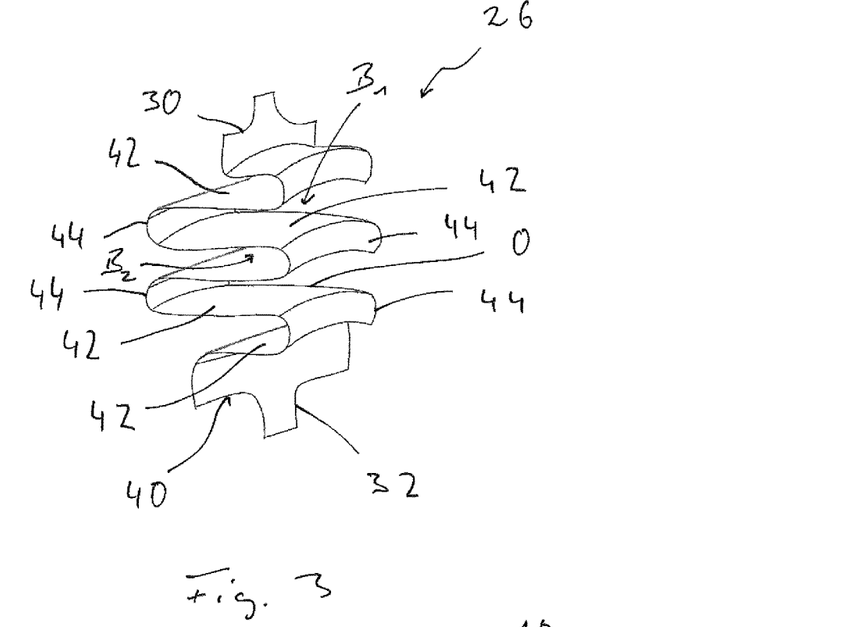
FIG. 3 is a perspective view of an electrically energizable heat conductor element having a band-like configuration and a meandering structure.
Figure 4:
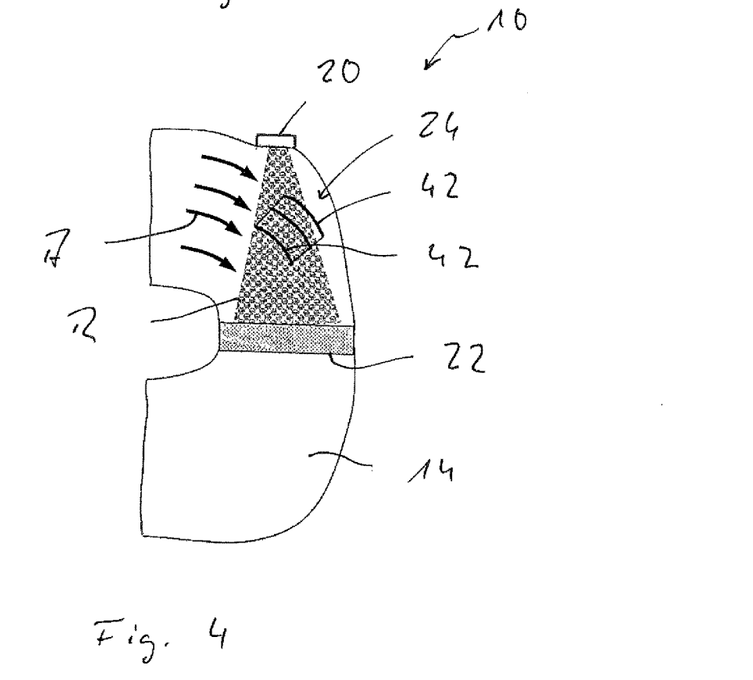
FIG. 4 is a sectional view of an exhaust gas-carrying duct with a heat conductor element according to FIG. 3 arranged in the reactant spray cone.

An alternative embodiment of the reactant heating device 24 is shown in FIGS. 3 through 7. FIG. 3 shows a heating element 26, which can be heated by electrical energization and which is provided as a band-like heat conductor element 40, for example, as a metal band, optionally with electrical insulation. The heating element 26 or the heat conductor element 40 is provided with a meandering structure between its two connection areas 30, 32 provided for the electrical contacting and thus it has a plurality of longitudinal sections 42, which are located essentially parallel to one another and adjoin each other in respective curvature areas 44.

Figure 5:
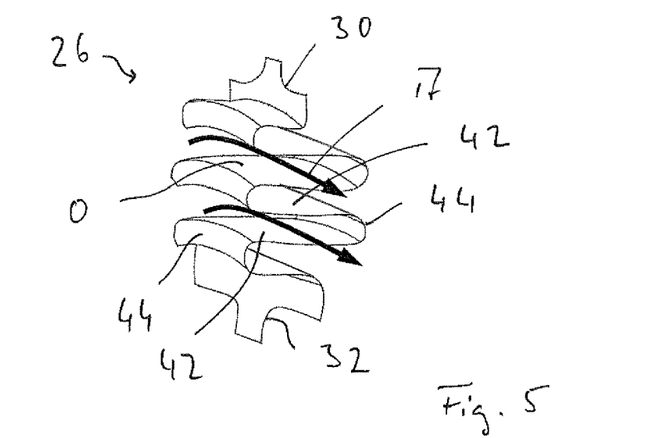
FIG. 5 is a perspective view of the heat conductor element according to FIG. 3 with the exhaust gas flow passed through same.

The band surface O provided essentially by the two broad sides B1, B2 of the heat conductor element 40, which are located facing away from one another, is oriented especially in the longitudinal sections 42 and in curvature areas 44 such that it is located, as this is indicated in FIG. 5, essentially parallel to the flow direction of the exhaust gas A. The flow of the exhaust gas A is thus largely prevented from being compromised especially in the area of the volume area V occupied by the spray cone of the reactant R. At the same time, the heat conductor element 40 provided with its meandering structure provides a comparatively large surface O, which the reactant R released by the reactant injection device 20 can reach and said surface can thus absorb heat. The heat conductor element 40 is preferably arranged such that the reactant R released by the reactant injection device 20 has a flow direction component parallel to the surface O, so that it can enter intermediate spaces formed between the sections 42 and thus it can reach the surface O.

Figure 6:
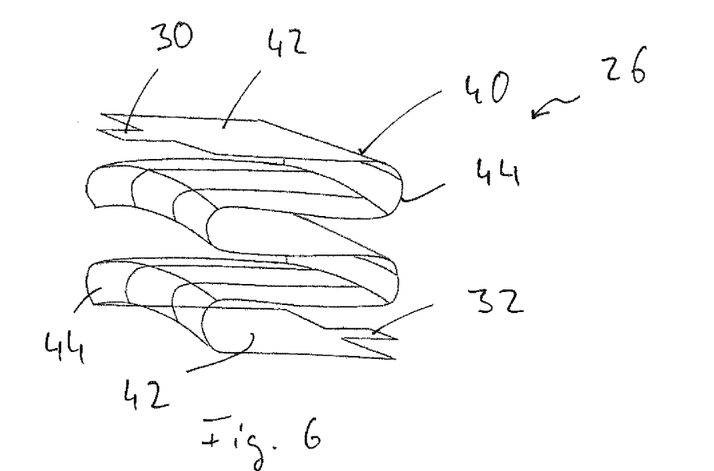
FIG. 6 is a perspective view of an alternative type of embodiment of a heat conductor element having a band-like configuration and a meandering structure.

An embodiment of the heating element 26 or of the heat conductor element 40, which has a different configuration especially in respect to the positioning, is shown in FIG. 6. It is seen that unlike in the embodiment according to FIG. 3, the two connection areas 30, 32 are not located in a common plane and oriented away from one another in this embodiment, but are arranged in planes located offset in relation to one another and such that they essentially continue the two last band sections 42 essentially in a straight line.

Figure 7A:
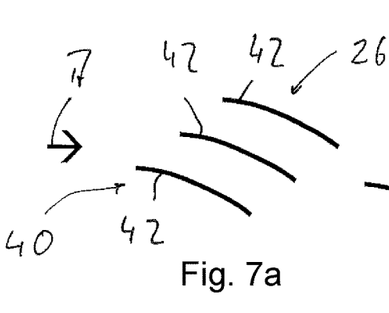
FIG. 7a is a schematic view of one or more heat conductor elements having a meandering configuration, which are arranged next to one another.
Figure 7B:
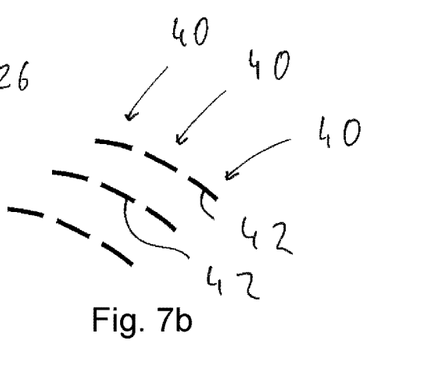
FIG. 7b is a schematic view of one or more heat conductor elements having a meandering configuration, which are arranged next to one another.
Figure 7C:
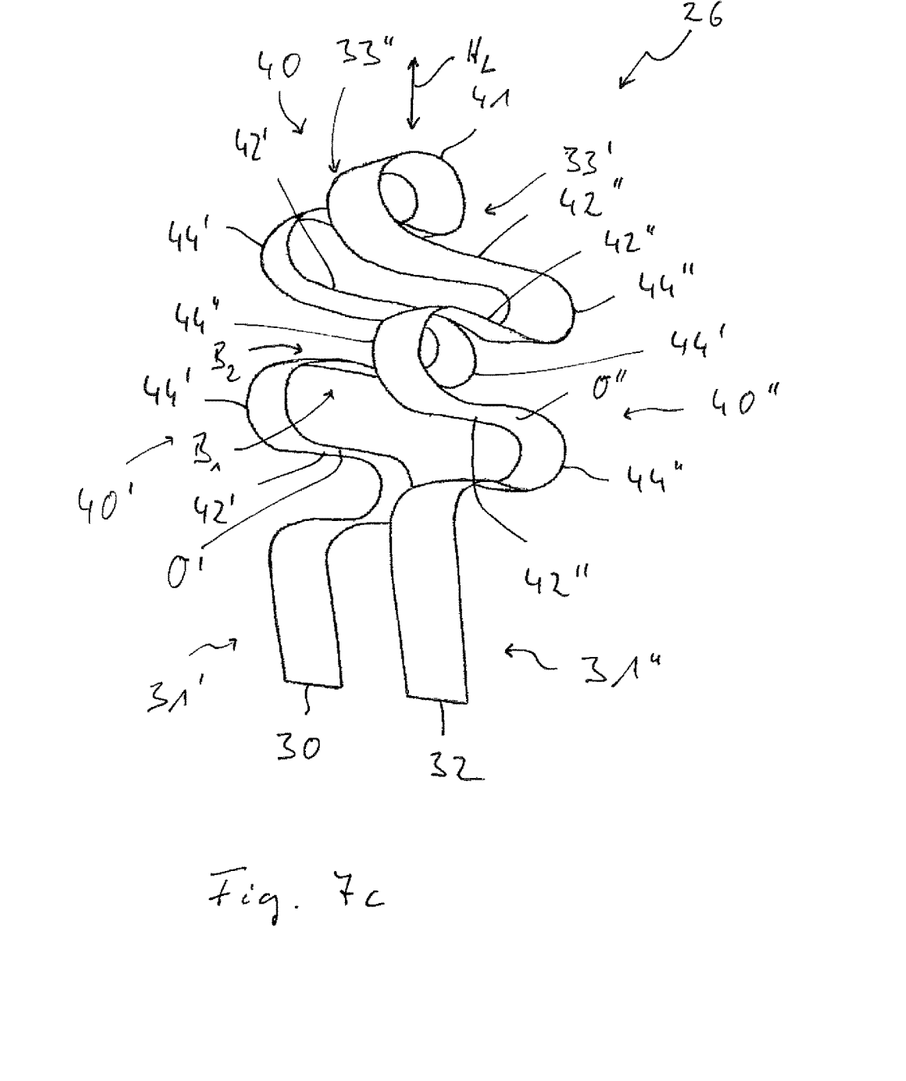
FIG. 7c is a perspective view of a heat conductor element with a plurality of heat conductor sections, which have a meandering configuration and are arranged next to one another.
Figure 8:
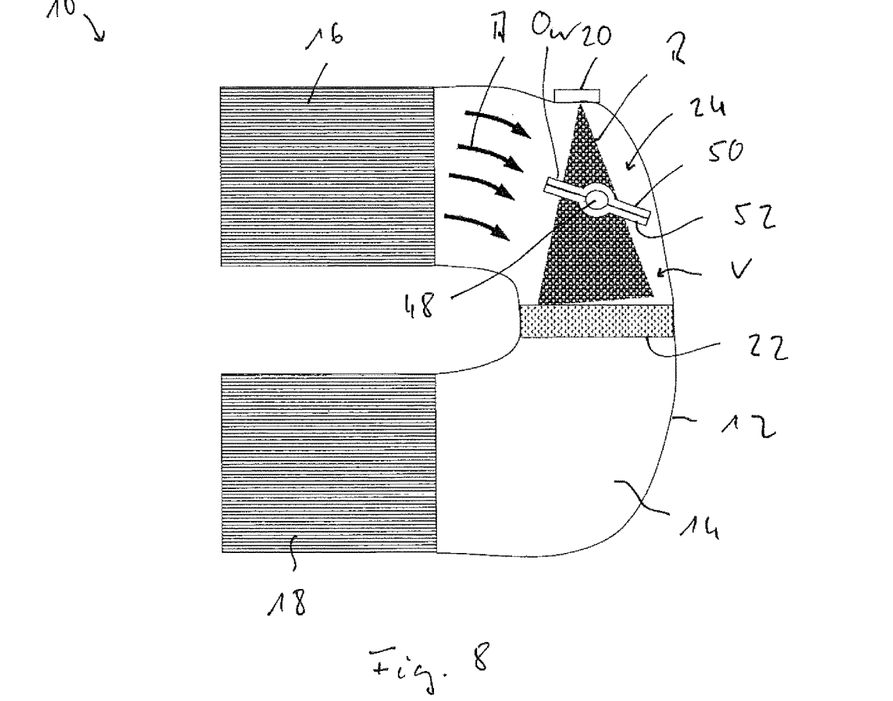
FIG. 8 is a sectional view of an alternative embodiment of an exhaust system, which view corresponds to FIG. 1.
Figure 9:
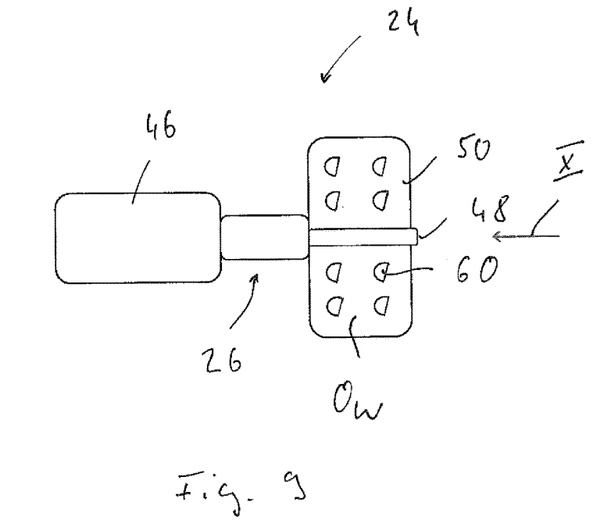
FIG. 9 is a top view of a reactant heating device used in the embodiment according to FIG. 8.
Figure 10:
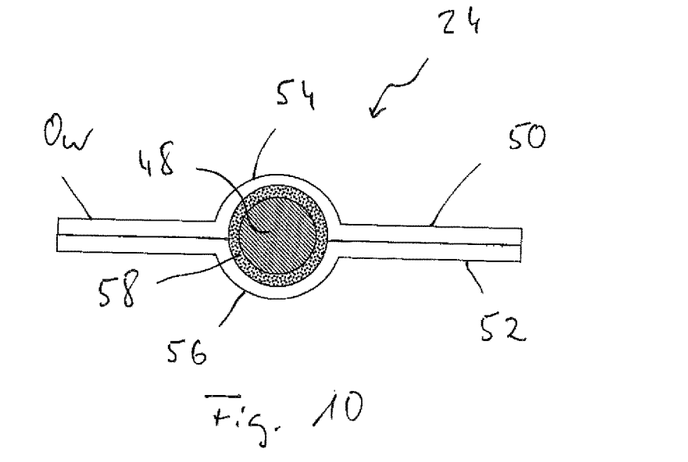
FIG. 10 is a front view of the reactant heating device according to FIG. 9 in the direction of view X in FIG. 9.

In a general view, FIGS. 7a, 7b and 7c show different embodiments of the heating device 24. The view in FIG. 7a corresponds essentially to the embodiment according to FIG. 3 or to FIG. 6 with a heat conductor element 40, which provides the heating element 26 and which has three band sections 42 oriented essentially parallel to one another in the example being shown. Three such heat conductor elements 40 are provided in FIG. 7b, which are located following one another essentially in the flow direction of the exhaust gas A and have, for example, each likewise three length sections 42 oriented essentially parallel to one another. The heat conductor elements 40 following each other in the flow direction of the exhaust gas A are preferably positioned such that their length sections 42 are arranged such that they continue one another in the flow direction, i.e., essentially aligned with one another, to reduce the flow resistance for the exhaust gas A flowing in the exhaust gas-carrying duct 14.

FIG. 7c shows a heating element 26 provided as a heat conductor element 40 having a band-like configuration. The heat conductor element 40 has two heat conductor sections 40', 40'', which extend essentially next to one another in the longitudinal direction HL of the heat conductor section and are each wound in a meandering pattern, i.e., they are provided with essentially wave-like structure. Bulges oriented alternatingly away from one another essentially at right angles to the longitudinal direction HL of the heat conductor section are formed in the area of the respective curvature areas 44', 44" of the heat conductor sections 40', 40", and the sections 42', 42" extend between said bulges.

The two heat conductor sections 40', 40" located next to one another have a connection area 30, 32 each in respective first end areas 31', 31". In respective second end areas 33', 33", the two heat conductor sections 40', 40" adjoin each other via a connection area and thus form an integral structure of the heat conductor element 40. The two connection areas 30, 32 are thus located directly next to each other and can electrically be contacted with correspondingly shaped opposite contact areas, for example, at an exhaust gas-carrying pipe, in a simple manner.

The surfaces O', O" of the heat conductor sections 40', 40", which are formed on respective broad sides B1, B2, are oriented essentially parallel to one another, so that there is a much lower flow resistance for the exhaust gas A flowing around the heat conductor element 40, while a comparatively large surface is at the same time available for heating the reactant R injected into the exhaust gas A. To make it possible to utilize the surface as efficiently as possible, the bulges of the two heat conductor sections 40', 40" formed in the area of the curvature areas 44', 44" are offset in relation to one another in the longitudinal direction HL of the heat conductor section in this heat conductor element 40 as well, so that, for example, a bulge is oriented in a second direction opposite the first direction at right angles to the longitudinal direction HL of the heat conductor section in the same length area of the other heat conductor section essentially where a bulge is oriented in a first direction at right angles to the longitudinal direction HL of the heat conductor section in one of the heat conductor sections 40', 40". The two heat conductor sections 40', 40" thus have a phase-shifted course in relation to one another, and the phase shift may be in the range of half the wavelength of the meandering or wave-like structure, but it may also assume other values. Therefore, when viewed in the flow direction of the exhaust gas A, they are not congruent. The length areas 42', 42" of the different heat conductor sections 40', 40", which extend between respective bulges or curvature areas 44', 44" are preferably also offset in relation to one another in the longitudinal direction HL of the heat conductor sections. It is ensured in this way that the heat conductor section positioned farther downstream is not shielded by the heat conductor section positioned farther upstream.

A structure as is indicated in FIG. 7b can be built, in principle, with the heat conductor element 40 shown in FIG. 7c, where heat conductor sections of a heat conductor element rather than individual heat conductor elements having mutually separate configurations follow each other in the flow direction of the exhaust gas A. A plurality of such heat conductor elements 40 may also be arranged, in principle, such that they follow one another, as is shown in FIG. 7c. Such a heat conductor element comprising a plurality of heat conductor sections may also be built with more than two heat conductor sections. For example, three heat conductor sections located essentially next to each other may be provided, in which case the two connection areas are not located next to each other, on mutually opposite sides.

FIGS. 8 through 11 show another alternative type of embodiment of a reactant heating device 24. In this type of embodiment, the reactant heating device 24 comprises a heating element 26, which is designed, for example, as a glow plug, which is carried with a body area 46, for example, on the exhaust pipe 12 and protrudes into the exhaust gas-carrying duct 14 with a heating area or glow area 48 heatable by electrical energization. Two plate-shaped heat transmission elements 50, 52 are carried on this heating area 48 in the example shown in FIGS. 8 through 10. The two heat transmission elements 50, 52 are shaped such that they form an essentially semicircular bulge 54 each in their section, which surrounds the heating area 48 and is located approximately in the longitudinal central area thereof, so that a volume area is formed, in which the heating area 48 is received, for example, via the intermediary of a heat transmission medium 58, e.g., metal powder or graphite film. The two heat transmission elements 50, 52 may be fastened to one another, for example, by pressing, welding or the like and are thus carried on the heating area 48 in a stable manner. To reduce the flow resistance and to improve the mixing of the reactant R released by the reactant injection device 20 with the exhaust gas A flowing in the exhaust gas-carrying duct 14, exhaust gas passage openings 60 may be formed in the heat transmission elements 50, 52, and exhaust gas guide elements may be provided, for example, adjoining these exhaust gas passage openings 60, for example, by bending out sections of the heat transmission elements 50, 52.

Figure 11:
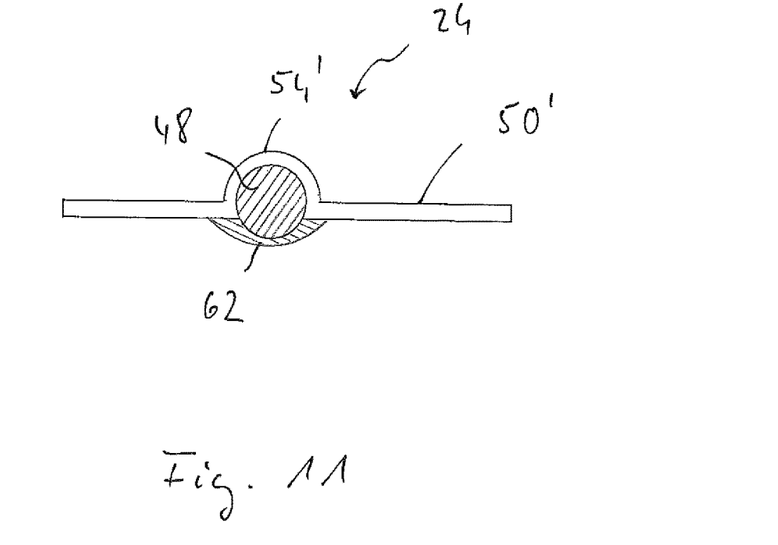
FIG. 11 is a view of an alternative embodiment, which view corresponds to FIG. 10.

An alternative embodiment is shown in FIG. 11. Only a single, plate-shaped heat transmission element 50' is provided in this embodiment with a circular bulge 54', which is arranged such that it surrounds the heating element 26 in the heating area 48 thereof. To achieve stable holding, the heating element 48 may be permanently connected to the heat transmission element 50, for example, by a weld seam 62, in the area not surrounded by the bulge 54'.

The reactant heating device with the plate-shaped heat transmission elements 50, 52 and 50', which are used for heat transmission, are also oriented in the embodiment shown in FIGS. 8 through 11 such that the heat transmission element surface OW provided by these is oriented essentially parallel to the flow direction of the exhaust gas A in the exhaust gas guide flow within the exhaust gas-carrying duct 14. This orientation provides the lowest possible flow resistance for the exhaust gas A.

Figure 12:
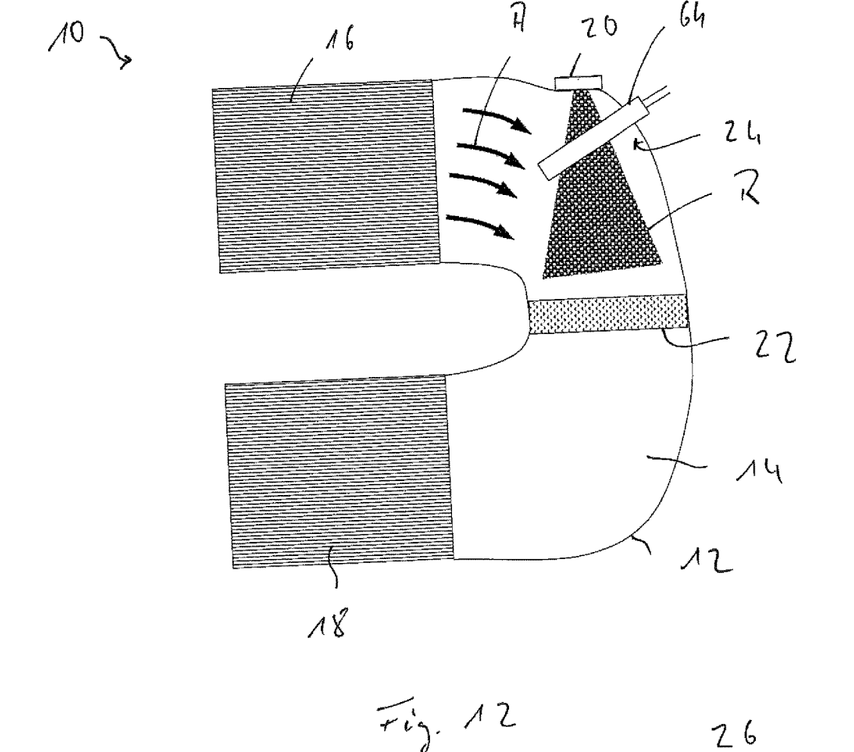
FIG. 12 is a sectional view of an alternatively embodied exhaust system, which view corresponds to FIG. 1.
Figure 13:
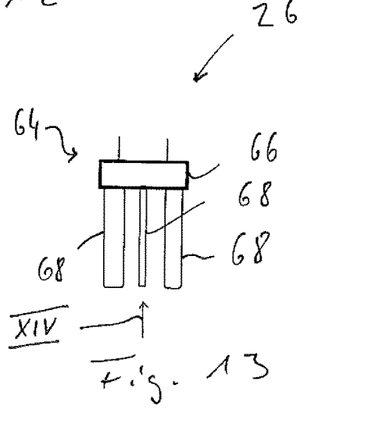
FIG. 13 is a type of embodiment of a reactant heating device with a plurality of rod-shaped heating sections of a ceramic heating element.
Figure 14:
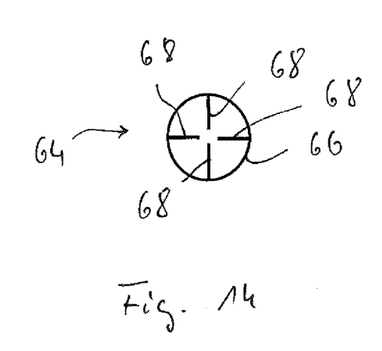
FIG. 14 is a view of the reactant heating device according to FIG. 13 in the direction of view XIV in FIG. 13.

Another alternative type of embodiment of a reactant heating device 24 is shown in FIGS. 12 through 14.

The reactant heating device 24 comprises a heating element 26, which can be heated by electrical energization and which is designed as a ceramic heating element 64 in his case. This comprises a carrier 66, which is fixed, for example, on the exhaust pipe 12, and a plurality of—four in the example being shown—rod-shaped heating sections 68 extending from the carrier 66 into the volume area V. These may be arranged in a star-shaped configuration in relation to one another, which is shown in FIG. 14, for efficient thermal interaction with the reactant R.

Figure 15:
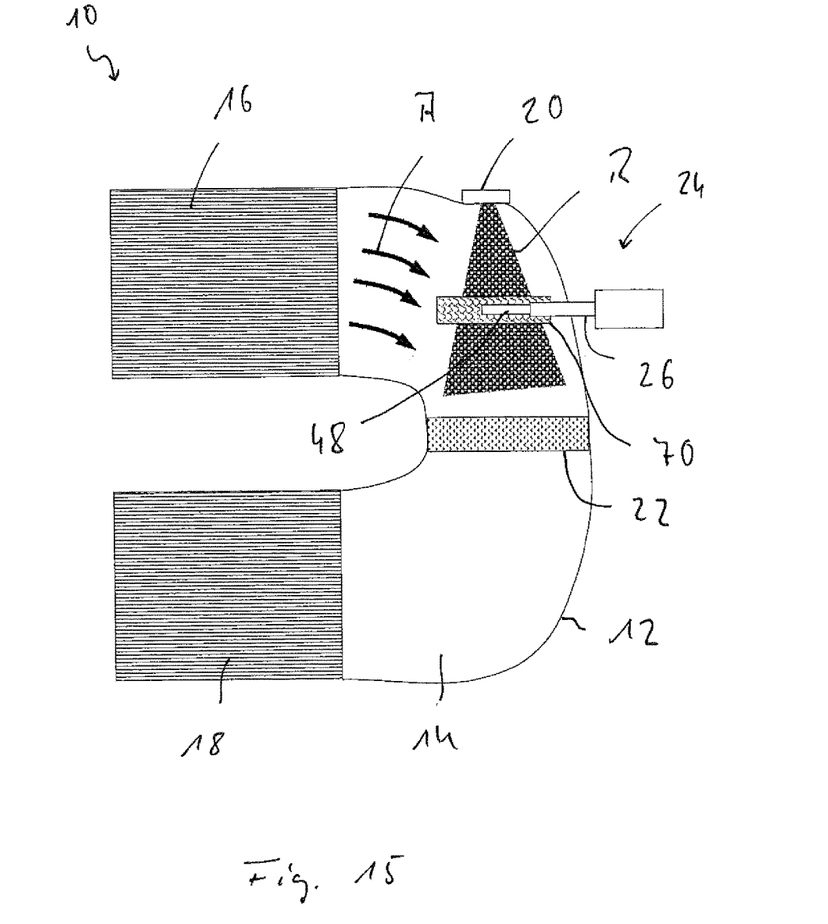
FIG. 15 is a sectional view of an alternative type of embodiment of an exhaust system, which view corresponds to FIG. 1.

Another type of embodiment of a reactant heating device 24 is shown in FIG. 15. The reactant heating device 24 comprises a heating element 26, which may correspond in terms of its configuration essentially to the heating element 26 shown in FIG. 9, and a heating area 48, which can be heated by electrical energization and which extends especially in the area of the volume area V. The heating area 48 is surrounded by a reactant receiving body 70 consisting of a porous material. The reactant R released by the reactant injection device 20 reaches the surface of the porous reactant receiving body 70 and can enter the inner volume area thereof by capillary delivery action. The reactant receiving body 70 thus forms a reactant storage means, in which the reactant is heated and released in the form of a vapor. This leads to a homogenization of the reactant flow released in vapor form into the flow of the exhaust gas A and then mixed completely with the exhaust gas A by the mixer device 22.

The reactant receiving body 70 is preferably made of a metal foam material or another porous material, e.g., wire mesh.

It should finally be noted that the exhaust system configured according to the present invention may, of course, also comprise a plurality of the above-described reactant heating devices having different configurations.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a vehicle, the exhaust system comprising:
    an exhaust gas-carrying duct;
    a reactant injection device injecting reactant into exhaust gas flowing in the exhaust gas-carrying duct;
    a mixer device for supporting a mixing of reactant injected by the reactant injection device with exhaust gas flowing in the exhaust gas-carrying duct, the mixer device being disposed downstream of the reactant injection device; and
    a reactant heating device which extends in the exhaust gas-carrying duct downstream of the reactant injection device and upstream of the mixer device, the reactant heating device being positioned such that exhaust gas, flowing in said duct and reactant injected by the reactant injection device flow around the reactant heating device, the reactant heating device comprising at least one heating element comprised of a heat conductor element, which is heated by electrical energization and around which exhaust gas and reactant flow, wherein the heat conductor element is wound in a meandering pattern and has a band-shape configuration with a band surface provided by two broad sides of the band-shaped conductor element facing away from one another and being essentially parallel to an exhaust gas flow direction.

2. An exhaust system in accordance with claim 1, further comprising a reactant treatment device arranged downstream of the mixer device, wherein the reactant treatment device comprises a catalytic converter device for selective catalytic reaction or a particle filter or a catalytic converter and a particle filter.

3. An exhaust system in accordance with claim 1, wherein each of the broad sides is exposed to the exhaust gas.

4. An exhaust system in accordance with claim 1, wherein each of the broad sides comprises an exhaust gas contacting surface for contacting the exhaust gas.

5. An exhaust system in accordance with claim 1, wherein each of the broad sides is contact with the exhaust gas.

6. An exhaust system reactant heating device heating element for an internal combustion engine of a vehicle with an exhaust system comprising an exhaust gas-carrying duct, a reactant injection device injecting reactant into exhaust gas flowing in the exhaust gas-carrying duct, a mixer device for supporting a mixing of reactant injected by the reactant injection device with exhaust gas flowing in the exhaust gas-carrying duct, the mixer device being disposed downstream of the reactant injection device and a reactant heating device which extends in the exhaust gas-carrying duct downstream of the reactant injection device and upstream of the mixer device, the reactant being positioned such that exhaust gas, flowing in said duct and reactant injected by the reactant injection device flow around the reactant heating device, the heating element comprising at least two heat conductor sections, which are wound in a meandering pattern, adjoin each other in a connection area and extend essentially next to one another, each of the at least two heat conductor sections having a band-shape configuration with a band surface provided by two broad sides facing away from one another and being parallel to an exhaust gas flow direction.

7. An exhaust system reactant heating device in accordance with claim 6, wherein each heat conductor section has, following one another in a longitudinal direction of the heat conductor section, a plurality of bulges, which are oriented alternatingly opposite each other essentially at right angles to the longitudinal direction of the heat conductor section, wherein bulges oriented in the same direction at right angles to the longitudinal direction of the heat conductor in at least two heat conductor sections are offset in relation to one another in the longitudinal direction of the heat conductor.

8. An exhaust system reactant heating device in accordance with claim 6, wherein the connection area connects band-shape configurations of the heat conductor sections.

9. An exhaust system reactant heating device in accordance with claim 8, wherein band surfaces of the heat conductor sections, which surfaces are provided on the broad sides of the heat conductor sections, are oriented essentially parallel to one another.

10. An exhaust system reactant heating device in accordance with claim 6, wherein two heat conductor sections have a connection area for electrical contacting in a respective first end area and are connected to another heat conductor section via a connection area in a respective second end area.

11. An exhaust system reactant heating device in accordance with claim 6, wherein each of the broad sides is exposed to the exhaust gas.

12. An exhaust system reactant heating device in accordance with claim 6, wherein each of the broad sides comprises an exhaust gas contacting surface for contacting the exhaust gas.

13. An exhaust system reactant heating device in accordance with claim 6, wherein each of the broad sides is contact with the exhaust gas.

14. An exhaust system for an internal combustion engine of a vehicle, the exhaust system comprising:
    an exhaust gas-carrying duct;
    a reactant injection device injecting reactant into exhaust gas flowing in the exhaust gas-carrying duct;
    a mixer device for supporting a mixing of reactant injected by the reactant injection device with exhaust gas flowing in the exhaust gas-carrying duct, the mixer device being disposed downstream of the reactant injection device; and
    a reactant heating device suspended from the exhaust gas duct such that the reactant heating device extends in a meandering pattern from a position adjacent to the exhaust gas duct to a position located at a spaced location from the exhaust gas duct in an interior space of the exhaust gas-carrying duct downstream of the reactant injection device and upstream of the mixer device, wherein one end portion of the reactant heating device is located at a spaced location from the exhaust gas-carrying duct, the reactant heating device being positioned such that exhaust gas, flowing in said duct and reactant injected by the reactant injection device flow around the reactant heating device.

15. An exhaust system in accordance with claim 14, wherein the reactant heating device comprises at least one heating element comprising a heat conductor element, which is heated by electrical energization and around which the exhaust gas and the reactant flow, wherein the heat conductor element is wound in a meandering pattern and has a band-shape configuration with a band surface provided by two broad sides of the band-shaped conductor element facing away from one another and being essentially parallel to an exhaust gas flow direction.

16. An exhaust system in accordance with claim 15, further comprising a reactant treatment device arranged downstream of the mixer device, wherein the reactant treatment device comprises a catalytic converter device for selective catalytic reaction or a particle filter or a catalytic converter and a particle filter.

17. An exhaust system in accordance with claim 15, wherein each of the broad sides is exposed to the exhaust gas.

18. An exhaust system in accordance with claim 15, wherein each of the broad sides comprises an exhaust gas contacting surface for contacting the exhaust gas.

19. An exhaust system in accordance with claim 15, wherein each of the broad sides is contact with the exhaust gas.

20. An exhaust system in accordance with claim 15, wherein the reactant heating device comprises a plurality of heat conductor sections, each of the heat conductor sections having, following one another in a longitudinal direction of the heat conductor section, a plurality of bulges, which are oriented alternatingly opposite each other essentially at right angles to the longitudinal direction of the heat conductor section, wherein bulges oriented in the same direction at right angles to the longitudinal direction of the heat conductor in at least two heat conductor sections are offset in relation to one another in the longitudinal direction of the heat conductor.

21. An exhaust system in accordance with claim 15, wherein the reactant heating device comprises a plurality of longitudinal sections and a plurality of arcuate sections, each of the longitudinal sections being connected to another one of the longitudinal sections via one of the arcuate sections, each of the longitudinal sections being located at a spaced location from another one of the longitudinal sections, each of the arcuate sections being located at a spaced location from another one of the arcuate sections, wherein the longitudinal sections and the arcuate sections define the meandering pattern of the reactant heating device.

* * * * *